United States Patent
Liu

(10) Patent No.: US 8,029,880 B2
(45) Date of Patent: Oct. 4, 2011

(54) WATER RESISTANT WIDE FLOORING BOARDS

(76) Inventor: David C. Liu, Marietta, GA (US)

( * ) Notice: Subject to any disclaimer, the term of this patent is extended or adjusted under 35 U.S.C. 154(b) by 656 days.

(21) Appl. No.: 12/109,158

(22) Filed: Apr. 24, 2008

(65) Prior Publication Data

US 2009/0269522 A1  Oct. 29, 2009

(51) Int. Cl.
*F16B 5/07* (2006.01)

(52) U.S. Cl. ............. 428/60; 52/309.8; 428/33; 428/53; 428/58

(58) Field of Classification Search ............. 428/60, 428/58, 53, 33; 52/309.8
See application file for complete search history.

(56) References Cited

U.S. PATENT DOCUMENTS

| | | | |
|---|---|---|---|
| 2,142,305 A | 1/1939 | Davis | |
| 6,101,778 A | 8/2000 | Martensson | |
| 6,182,413 B1 * | 2/2001 | Magnusson | 52/589.1 |
| 6,397,547 B1 | 6/2002 | Martensson | |
| 6,421,970 B1 | 7/2002 | Martensson | |
| 6,588,166 B2 | 7/2003 | Martensson | |
| 6,966,161 B2 | 11/2005 | Palsson et al. | |
| 7,152,379 B2 | 12/2006 | Lin | |
| 7,225,591 B2 | 6/2007 | Lin | |
| 2002/0152707 A1 * | 10/2002 | Martensson | 52/592.2 |
| 2003/0145550 A1 * | 8/2003 | Bennett et al. | 52/592.1 |
| 2004/0074190 A1 | 4/2004 | Lin | |
| 2004/0206038 A1 | 10/2004 | Stanchfield | |
| 2006/0032175 A1 * | 2/2006 | Chen et al. | 52/578 |
| 2007/0022695 A1 | 2/2007 | Magnusson | |
| 2007/0062153 A1 | 3/2007 | Li | |
| 2008/0078469 A1 * | 4/2008 | Lee | 144/329 |

FOREIGN PATENT DOCUMENTS

| | | |
|---|---|---|
| JP | 07-158232 A | 6/1995 |
| JP | 03515075 B2 | 4/2004 |
| KR | 10-2002-0066607 A | 8/2002 |
| KR | 10-2004-0001390 A | 1/2004 |
| KR | 10-2005-0002919 A | 1/2005 |

OTHER PUBLICATIONS

Data Sheet 1350-1 for Lamaphon CPB Cement Particle Acoustic Floor Board, Siderise Insulation Limited Forge Industrial Maeteg Wales UK CF34 OAZ.
Printout from the Internet http://www.ibuonline.com/productdetail/Floor-Board-Aluminum-Foam-Composite-With-Marble/4cb424f88906a88337277306, Floor Board—Aluminum Foam Composite With Marble, from IBUonline.com.
International Search Report and Written Opinion issued on Dec. 14, 2009, for the corresponding PCT application.
International Search Report and Written Opinion issued on Jul. 8, 2009, for the corresponding PCT application.

\* cited by examiner

*Primary Examiner* — Brent O'Hern
(74) *Attorney, Agent, or Firm* — Wang Law Firm, Inc.; Li K. Wang

(57) ABSTRACT

A water resistant floor board comprises a top layer, a tongue connector, a groove connector, a body, and a bottom layer. The body is made from a man-made material and placed between the tongue connector and the groove connector, and the top layer is placed above the body, the tongue connector, and the groove connector. The bottom layer is a moisture resistant aluminum foil covering the body, the tongue connector, and the groove connector. The tongue and groove connectors are made from moisture resistant solid wood, and the body is made from man-made material. The top layer has a moisture resistant coating.

23 Claims, 11 Drawing Sheets

WATER RESISTANT WIDE FLOORING BOARDS

FIELD OF THE INVENTION

The invention relates to wood flooring, and more particularly, to water resistant flooring boards.

BACKGROUND OF THE INVENTION

Wide plank boards (wider than 3¼") are desirable in the hardwood flooring market because they show more wooden characteristics. The wide plank floor boards have been accepted as high end products and having a high value because they are made from a very limited resource, namely trees with a large diameter, and the production process has a low yield (only a small port of trees can offer large width boards). The wide plank floor board installation is also faster because it reduces the number of nails needed for an average square foot during the installation and thus saves installation time.

Wide plank hardwood floors, however, often experience dimensional instability, which is caused by its dimension, more specifically, its width, which varies as the moisture and temperature of the environment change. As season changes and air conditioner or heater is used, the indoor moisture and temperature change and consequently cause the moisture level in hardwood floor boards to change. Variation in the moisture level in the hardwood floor boards causes stress inside each hardwood floor board, which lead to wrapping, cupping, or popping up or shrinking after the installation. As the result, the hardwood floor shows gaps between the floor boards or bumps on the hardwood floor.

Wide hardwood flooring boards may shrink or expand before they arrive at the installation site. Shrinking and expansion changes the floor board's width and makes installation difficult. Thus the stability of hardwood floor boards (wider than 3¼") is especially important to installation and maintenance of a hardwood floor. For this reason, hardwood floor boards, especially oak floor boards, are often processed to a width between 2.25" and 3.25".

It has been a major goal for hardwood flooring manufacturers to create a wide plank with less tree resource and with more stability. The traditional engineered hardwood uses layers of hardwood veneer to create a floor board, and these veneer layers are stacked on top of each other with the wood grain in one layer oriented perpendicular to the wood grain of another layer. Once the desired thickness is achieved, the boards are then cut into the correct board width. From there, the boards are then manufactured to have a tongue or groove on the edges. By doing this, the engineered hardwood floor board becomes less susceptible to the variation of moisture and temperature, because wood expands and contracts in the direction of the wood grain. Therefore engineered hardwood floor board is referred to as being dimensionally stable.

This traditional engineered floor board improves the stability to some degree, but it does not offer improvement under extreme dry or flood situations. As the air humidity falls very low, such as below 30-35%, the engineered floor boards are likely to delaminate because shrinking of wood layers causes stress and tears some layers inside of multilayer boards. During a flooding of short duration, multilayer floor board is not strong enough to remain stable and consequently floor board warps or cups.

Most of the traditional engineered floor boards used glue for tying down because the body of a multilayer boar is not strong enough to grip the nails. A traditional engineered floor board contains a high amount of glue in its body, which also has a high level of formaldehyde. The price of traditional engineered floor boards increases as their thickness increases. A traditionally engineer floor board is also lighter than a solid hardwood floor board, and this weight factor is perceived as having a low value in the market place.

Therefore, there is a need for floor boards that have a solid wood appearance and are water resistance, and it is to such floor boars the present invention is primarily directed to.

SUMMARY OF THE INVENTION

The present invention provides a water resistant floor board. The water resistant floor board comprises a top layer, a tongue connector, a groove connector, a body, and moisture resistant bottom layer. The top layer has a length, a top surface, and a under surface, and the top layer also has a left edge and a right edge. Top layer can be single wood veneer or multi strip wood veneer. The tongue connector is made from a moisture resistant solid wood, and the tongue connector has a top surface and a bottom surface. The top surface of the tongue connector is attached to the under surface of the top layer and aligned along the left edge of the top layer. The groove connector is made from a moisture resistant solid wood, and the groove connector has a top surface and a bottom surface. The top surface of the groove connector is attached to the under surface of the top layer and aligned along the right edge of the top layer. The body has a top surface and a bottom surface and is placed between the tongue connector and the groove connector. The moisture resistant bottom layer has a top surface and a bottom surface, and the bottom surface of the bottom layer seals completely the bottom surface of the tongue connector, the bottom surface of the groove connector, and the bottom surface of the body.

BRIEF DESCRIPTION OF THE DRAWINGS

Features and advantages of embodiments of the invention will become apparent as the following Detailed Description proceeds, and upon reference to the Drawings, where like numerals depict like elements, and in which.

DETAILED DESCRIPTION OF THE INVENTION

The present of invention is directed to design and manufacture floors board that is resistant to water, while providing the floor an appearance of solid wide wood floor boards. The floor board of the invention feels as heavy as solid hardwood floor, can be installed faster than solid hardwood floor strip via nail down, and can be maintained easily. In addition, this floor board is environmentally green because it reduces use of expensive wide wood plank, utilizes waste wood materials, and minimizes use of glue/formaldehyde.

Water causes many problems to wooden floor boards, among them warping. The warping happens when a floor board loses or gains moisture unevenly. After a tree is cut down into logs, the logs will gradually lose its moisture. The process of losing moisture continues as logs are cut into planks and the planks are kiln dried. The cutting of logs into planks is a wasteful process. The planks cut from a log are roughly only 15-20% of a log's volume and the warping problem reduces even more the yield of useful planks from each log. Loss of moisture causes stress in the planks and the stress can make a plank twist and warp. The warping is noticeable for wide planks and makes warped planks undesirable and less useful. The loss of water continues after the floor boards are milled and installed.

The warping continues to be a problem after the planks are made into floor boards. The warping problem may be minimized if the floor board is not wide, i.e., its width is small. When the width is small, for example 2.25", the warp caused by the variation in a board's moisture level may not be easily noticed. However, for floor boards with width of 4", 5", 7", or 8", the warp will be easily observed. Similarly, shrink, cupping problem (bump ups) is also easily observed.

Figure 1:
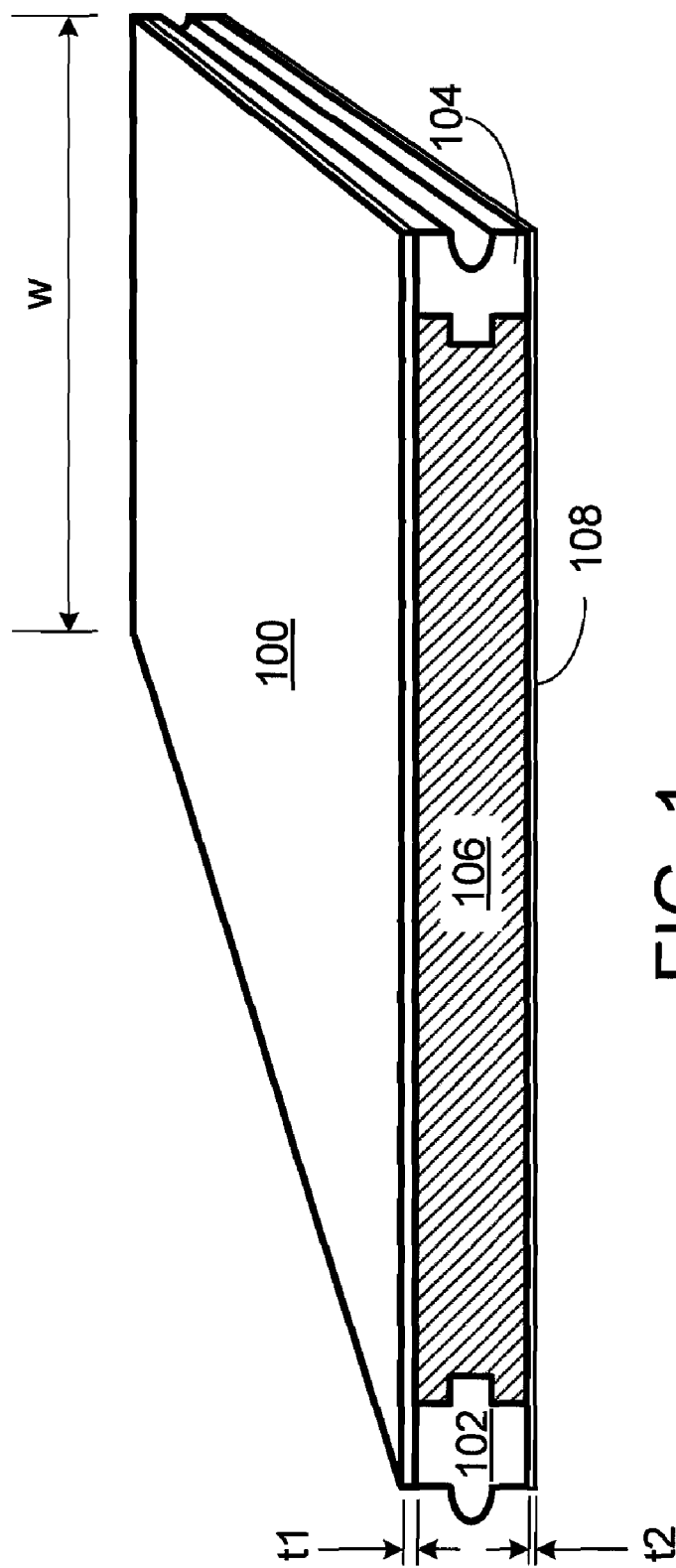
FIG. 1 illustrates a perspective view of a water resistant floor board according to one embodiment of the invention.

FIG. 1 depicts a perspective view of a floor board according to the present invention. The floor board 100 minimizes the warping problem caused by water. The floor board has a top layer 100, a body 106, a tongue connector 102, a groove connector 104, and a bottom layer 108. The top layer 100 may be a wood veneer layer made from a quality wood, such as teak, and with a layer of water/moisture resistant coating, such as polyurethane or other adequate materials. The thickness t1 of wood veneer layer may be between 0.3 to 7 mm and is preferably coated with a thin layer of polyurethane. The wood veneer 100 is usually glued to the body 106.

Alternatively, the top layer 100 may be a laminated layer made from a printed paper with a plastic wear layer. The laminated layer may be glued to the body 106. The top layer 100 may be a plastic layer, such as vinyl, or layer made from leather or man-made leather. The usage of plastic layer or laminated layer allows different patterns to be placed on the top of floor boards, thus making the floor boards more attractive to the consumers. The top layer 100 may also be made from a bamboo layer.

The body 106 can be made from man-made material, such as particle board, medium density fiberboard, high density fiberboard, plywood, cement board, wood/plastic composite, porcelain, foam, rubber, composite silicate board, or other suitable materials. The moisture resistant quality of the body is not important since the body will be mostly insulated from moisture (it is important to flood resistant as the floor board soak in flood). Therefore, more economic material can be used for the body. Use of material such as cement board, foam, or other man-made material also reduces use of wood and thus slowing deforestation that harms the environment. However, for flood application, when floor boards may be immersed under water periodically, the moisture resistant quality becomes important. For flood application, the body of floor board is preferably made from moisture resistant material such as cement board, wood/plastic composite, porcelain, foam, rubber, composite silicate board, etc.

The tongue connector 102 and the groove connector 104 are preferably made from solid wood that has moisture resistant quality. However, normal wood coated with a moisture resistant barrier may also be used. When some water enters into contact with the connector after an extensive time during a flood situation, the connector will not suffer major deformation because of its small width. If there is some stress in the connector, the stress will not be strong enough to deform the floor board's body. If there is some deformation, the deformation can be easily absorbed by the gap between two adjacent floor boards. The nail down installation also allows better control of stress from the connectors. Preferably the tongue connector 102 and groove connector 104, because of their small sizes, are made from materials that are left over from cutting logs into large planks. By utilizing the left over materials, a better efficiency in log processing can be achieved and waste can be minimized. Teak is a wood that possess such quality because of natural oil in its texture; however, other chemically treated moisture resistant wood may also be used. The tongue connector 102 and the groove connector 104 are glued onto the opposite sides of the body 106 and under the top layer 100. The glue is water resistant and effectively seals both sides of the body 106 and one example of such glue is polyvinyl acetate (PVAc) adhesives. Because the tongue connector 102 and the groove connector 104 are made from small pieces of solid wood, an installer can fix the floor board on the subfloor drive by driving a nail through these connectors and into the subfloor. This is an advantage compared with other moisture resistant floor board that has edges made of thermosetting laminate, which cannot be nailed to the subfloor.

The tongue and groove connectors can also be wrapped with a water resistant barrier around their edges. Aluminum foil can also be used to wrap around the groove and tongue areas. Mechanic lock can be used with the connectors. Most of solid wood boards do not offer enough stability for mechanic lock, but the floor board of the present invention can offer high performance stability before and after installation. This will insure the mechanic lock is secured even when the moisture level in the floor board changes.

The bottom layer 108 is a moisture resistant layer that glues to the entire bottom surface of the floor board. The bottom layer 108 may be aluminum foil, plastic sheet, oil-treated paper, plastic foam underlayment (moisture resistant) or other moisture resistant thin material. The bottom layer 108 may also be a simple layer of water resistant coating. Though aluminum foil is preferred for the bottom layer 108 because its insulating property and thin thickness, those skilled in the art will appreciate other material with water and/or moisture resistant quality may also be used.

Figure 5:
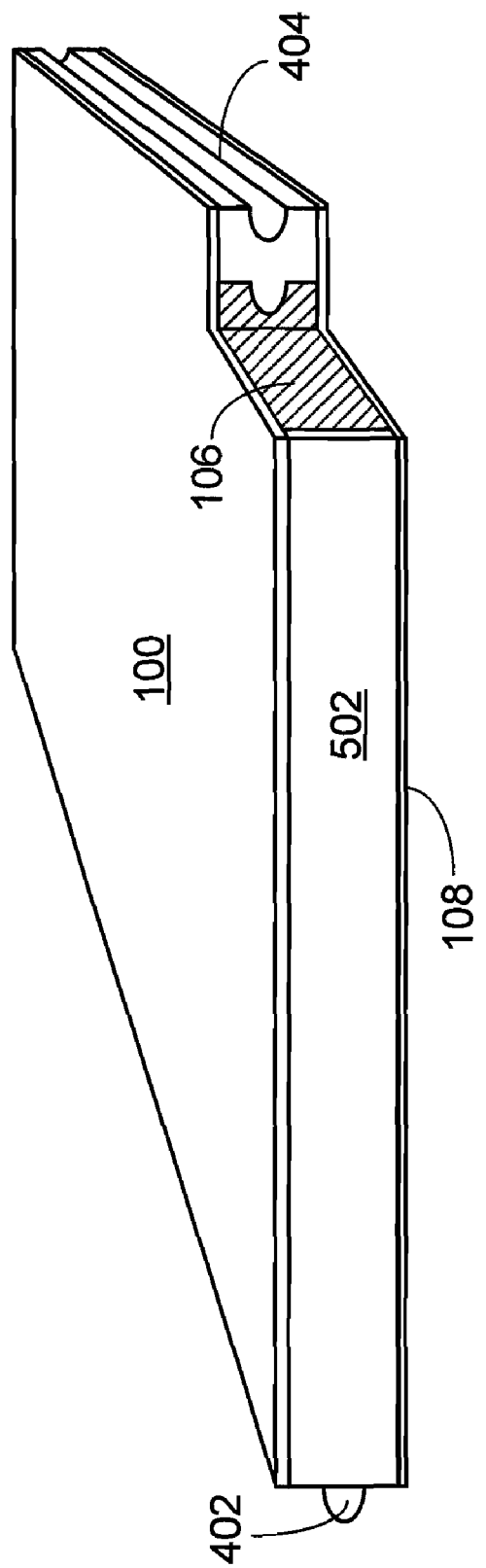
FIG. 5 illustrates a perspective view of an alternative embodiment of a floor board.
Figure 6:
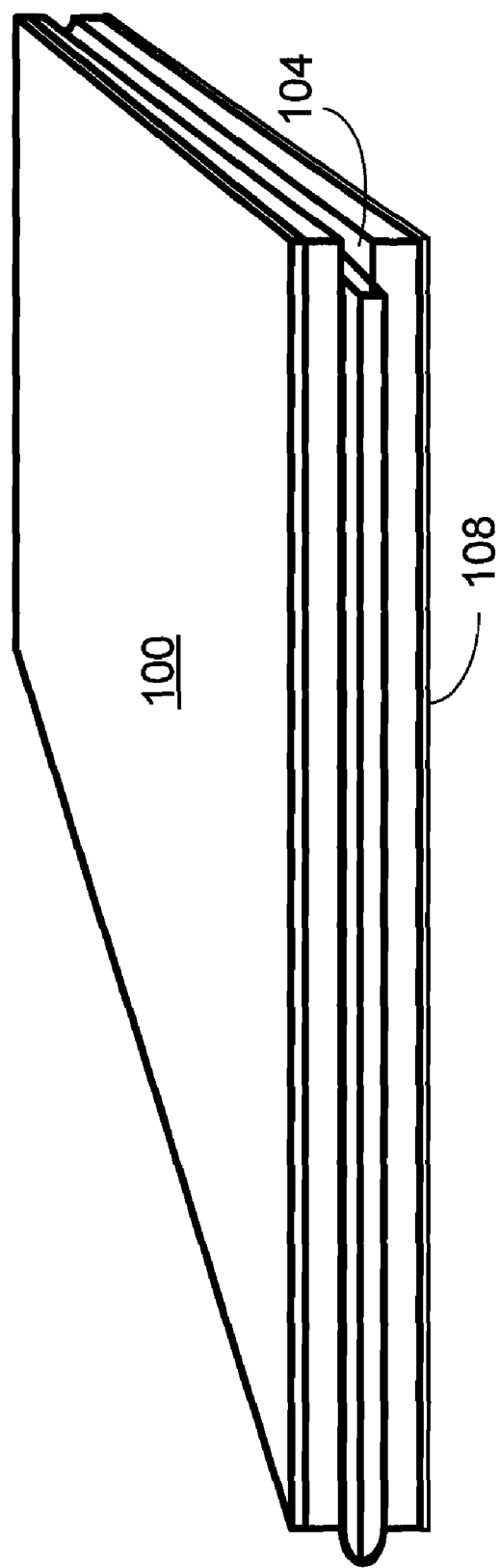
FIG. 6 illustrates a perspective view of yet another alternative embodiment of a floor board.

Though not shown in FIG. 1, the tongue connector 102 and groove connector 104 may be placed on all four lateral surfaces of a floor board as shown in FIG. 6, thus effectively enclosing the body 106. The body 106 is enclosed by moisture resistant glue used to glue the top layer 100, the tongue connector 102, the groove connector 104, and the bottom layer 108 onto the body 106. Because the body 106 is effectively enclosed and not exposed to water, wood of lesser quality can be used, thus reducing the cost of the floor boards. Alternatively, two lateral surfaces of the body 106 may be enclosed by two flat woods 502 as shown in FIG. 5. FIG. 5 illustrates a floor board with a one corner cutoff to show a piece of the flat wood 502.

Figure 2:
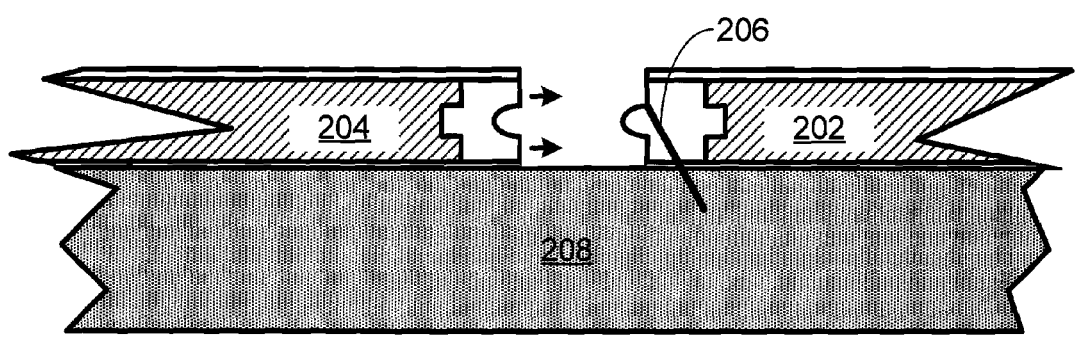
FIG. 2 illustrates a cross section view of two floor boards during assembly.
Figure 3:
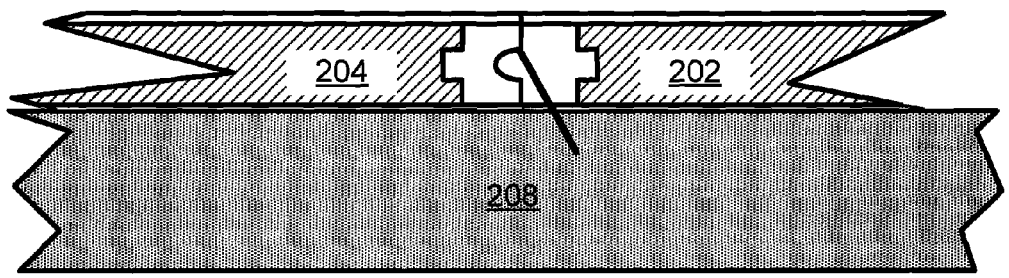
FIG. 3 illustrates a cross section view of two floor boards after assembled.

FIGS. 2 and 3 illustrate assembly of two adjacent floor boards 202, 204. The floor board 202 is fit against an adjacent board (not shown) and then fixed on the underlay (or subfloor) 208 by driving a nail 206 through the tongue connector. The nail 206 reaches into the underlay 208, thus preventing the movement of floor board 202. After the floor board 202 is fixed, another floor board 204 can be placed firmly adjacent to the floor board 202. The groove connector of floor board 204 engages to the tongue connector of the floor board 202, thus preventing a relative vertical movement between these floor boards. The floor board 204 will be affixed to the underlay in the same manner as the floor board 202.

Because of special construction of the floor boards, these floor boards may resist even great level of moisture. The floor boar of this invention is adapted for applications in bathroom, basement, sun room, screened porch, restaurant, etc, where the possibility of floor exposed to liquid is great. After the floor boards are assembled, if a liquid is spilled on the top of the floor boards, the top layer 100 with its moisture resistant coating provides some water protection to the top layer 100. The liquid may infiltrate through the gap between the floor boards and reaches the tongue connector and the groove connector. Because of the moisture resistant quality of the solid wood used, the tongue and groove connectors will not absorb much liquid. Even if the tongue and groove connectors absorb some moisture, the damage will be minimal because the tongue and groove connectors are made from small piece of solid woods and occupy a relatively small area and will not cause noticeable warping. If the liquid passes through the tongue and groove connectors, it will not cause much damage to the body 106 of the floor board because the bottom layer 108 insulates the liquid from the body 106.

Figure 4:
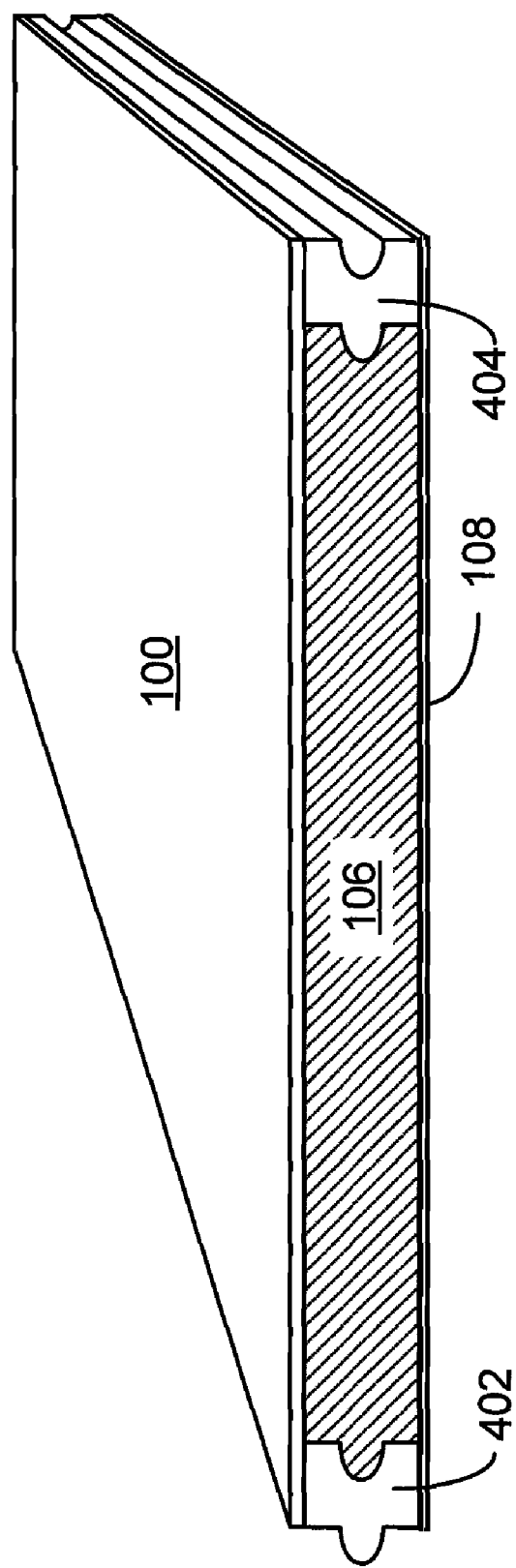
FIG. 4 illustrates a perspective view of a water resistant floor board according to an alternative embodiment of the invention.
Figure 11:
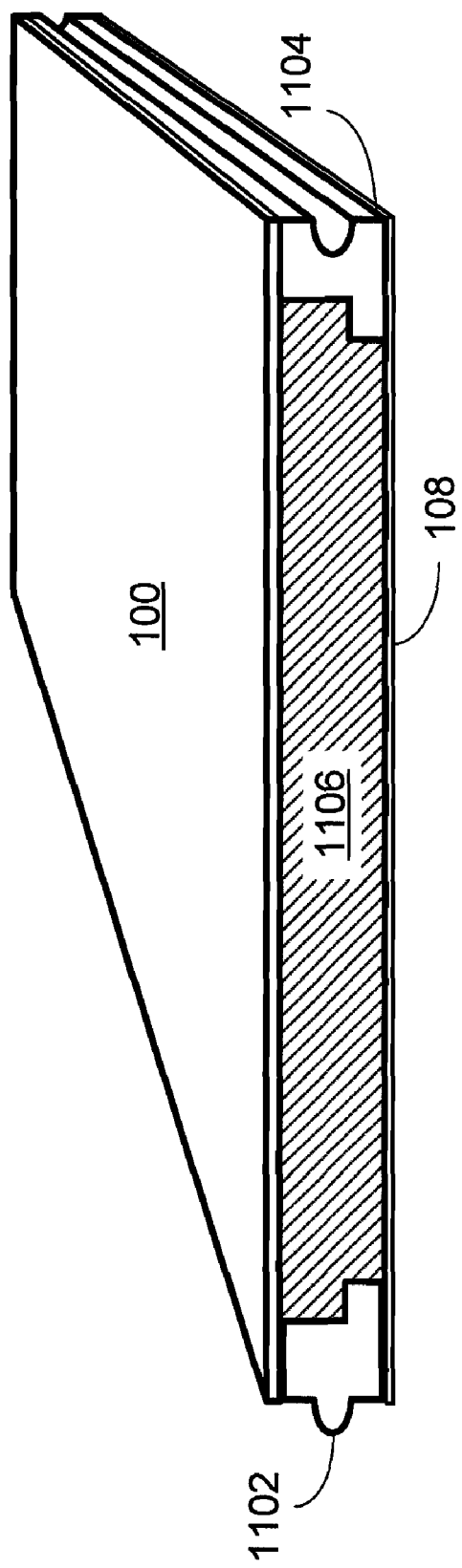
FIG. 11 illustrates an alternative embodiment with connectors having "L" shape profile.

FIG. 4 illustrates an alternative embodiment of a floor board with two lateral connectors 402, 404. The lateral connectors 402, 404 are identical in shapes thus making it easier and cheaper to manufacture. FIG. 11 illustrates another alternative embodiment of a floor board with two lateral connectors 1102, 1104. The connectors 1102, 1104 have an "L" shape profile and the body 1106 has a corresponding profile. Though three different profiles for tongue and groove connectors are illustrated, those skilled in the art will appreciate connectors of different profile may also be used without departing from the spirit of the present invention.

Figure 7:
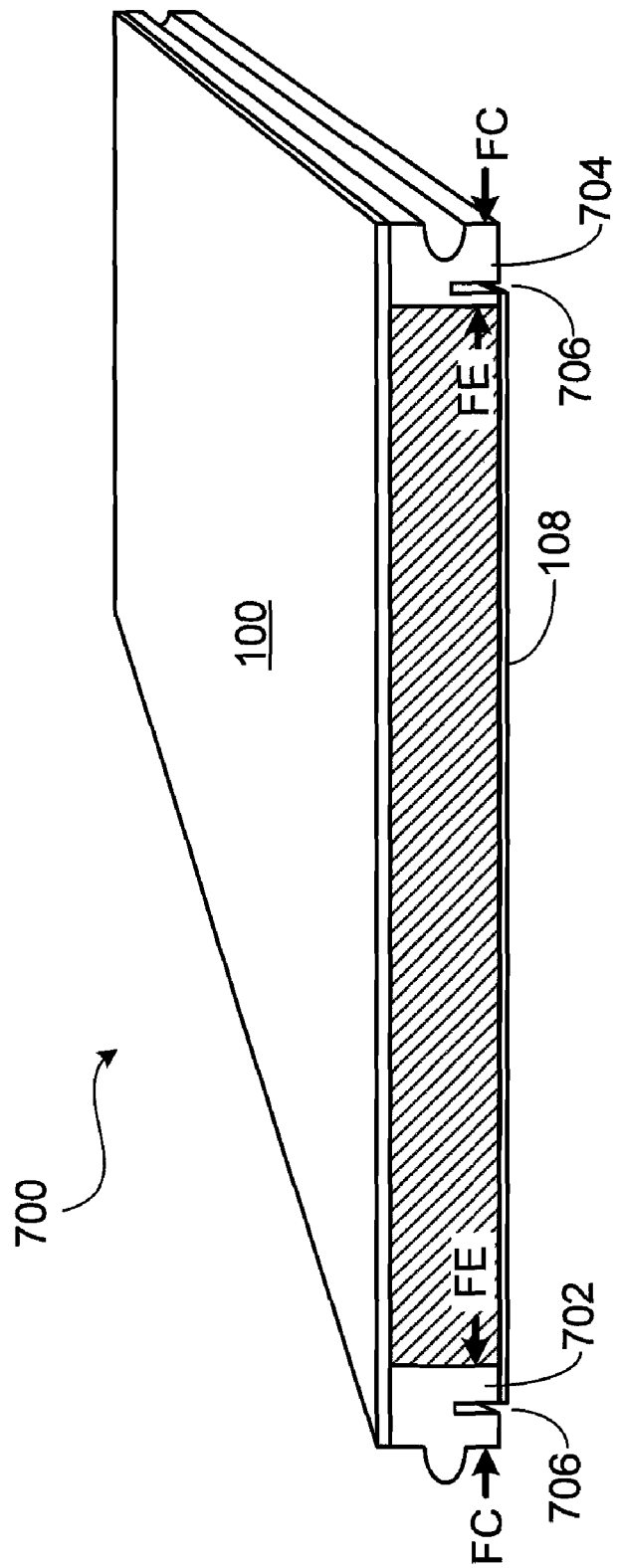
FIG. 7 illustrates an alternative embodiment with tongue and groove connectors adapted to expansion and shrinking of hardwood floor.

FIG. 7 illustrates an alternative embodiment of a floor board 700 with tongue and groove connectors adapted for expansion and contraction. The tongue connector 702 and groove connector 704, each has an expansion slot 706 along its entire length. Optionally, several expansion slots 706 of limited length may be distributed along the length of a tongue or groove connector. Because of the natural elasticity of wood, the expansion slot 706 can absorb compression force FC from lateral board of both side and expansion force. FE caused by stress from its own body, thus preventing gaps or bumps on the hardwood floor.

Figure 8:
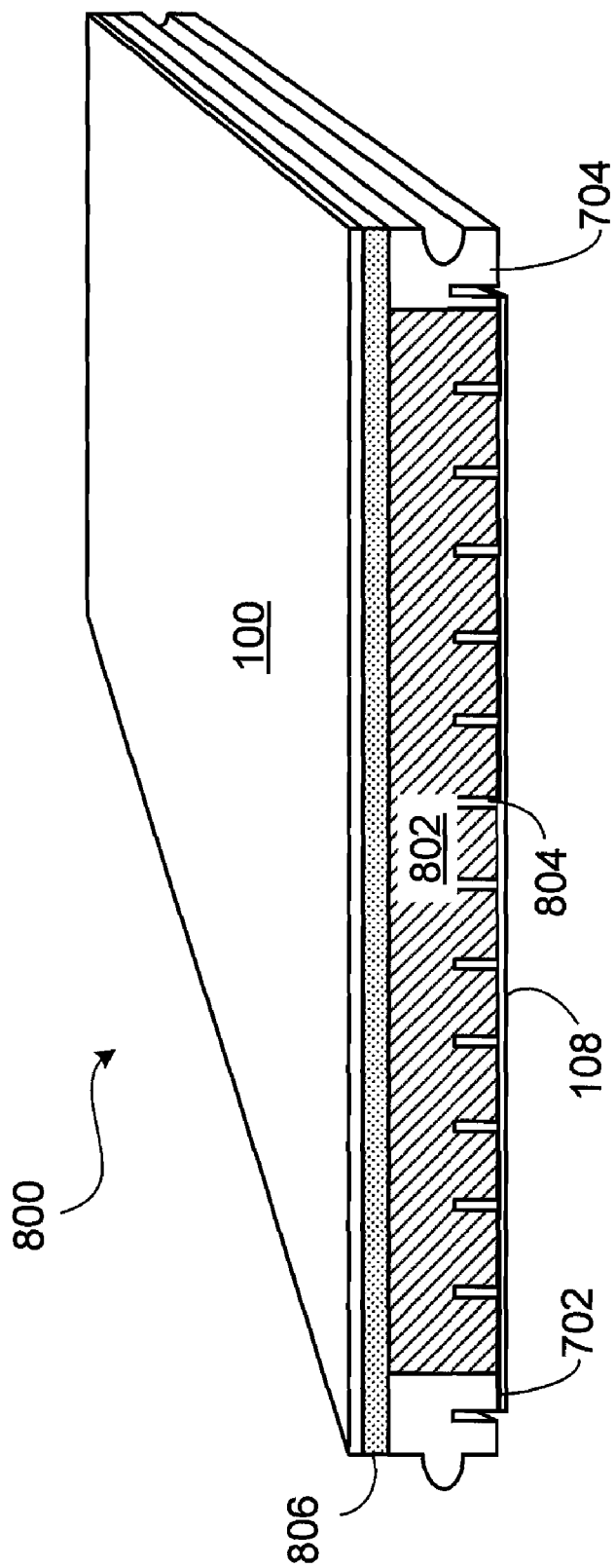
FIGS. 8-10 illustrate alternative embodiments of the present invention.
Figure 9:
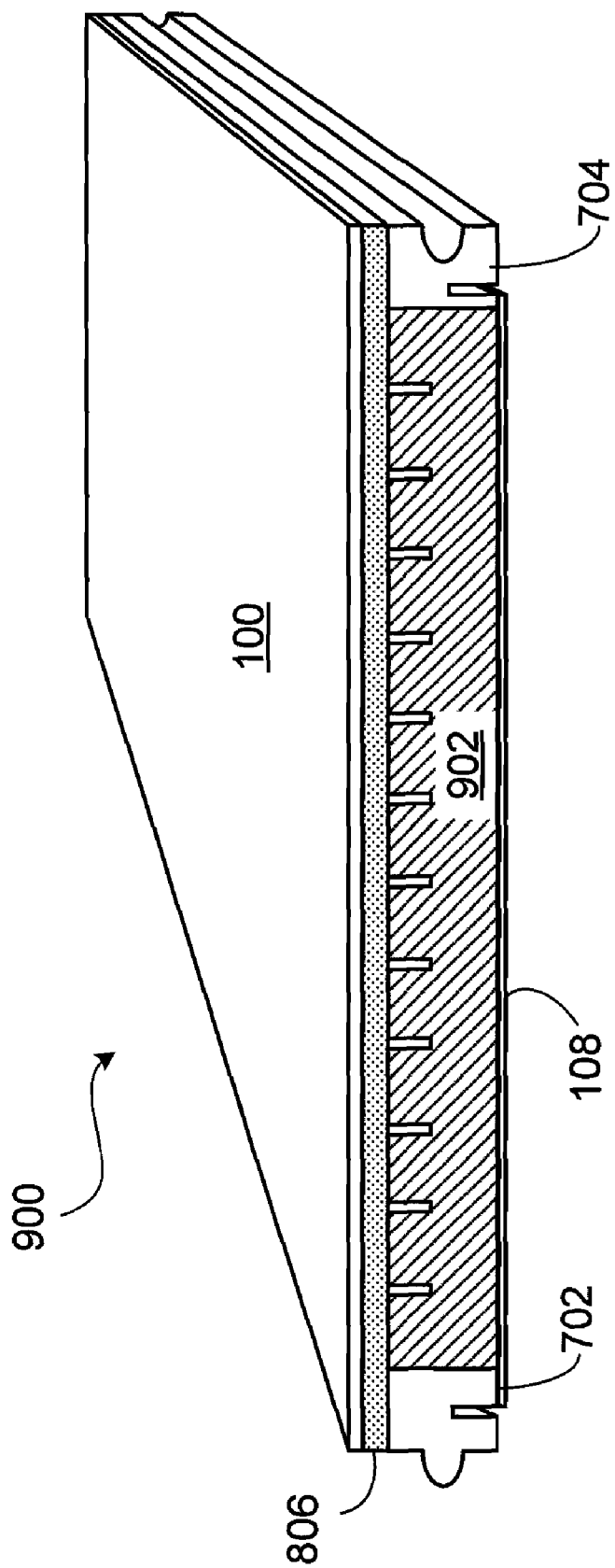
Figure 10:
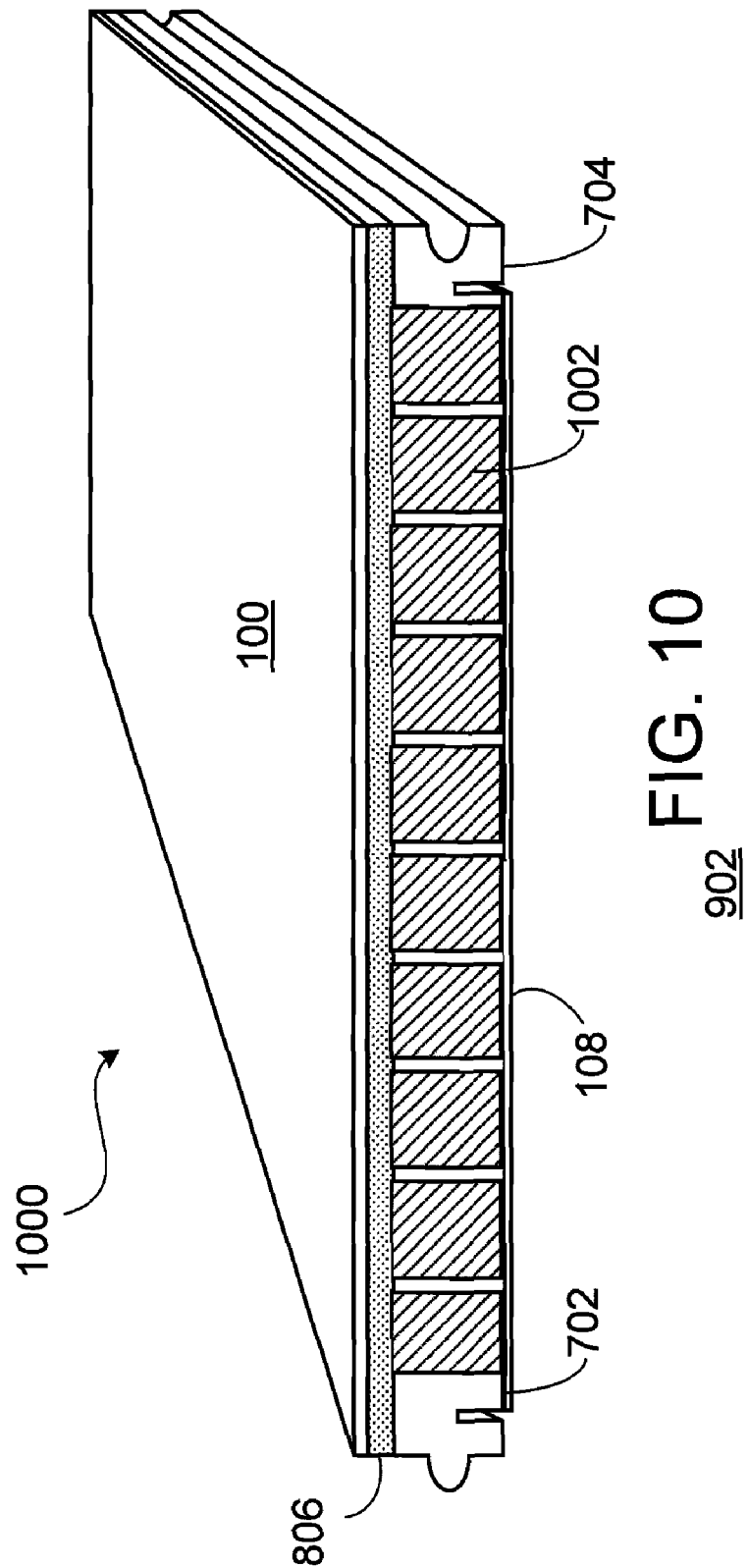
Figure 12:
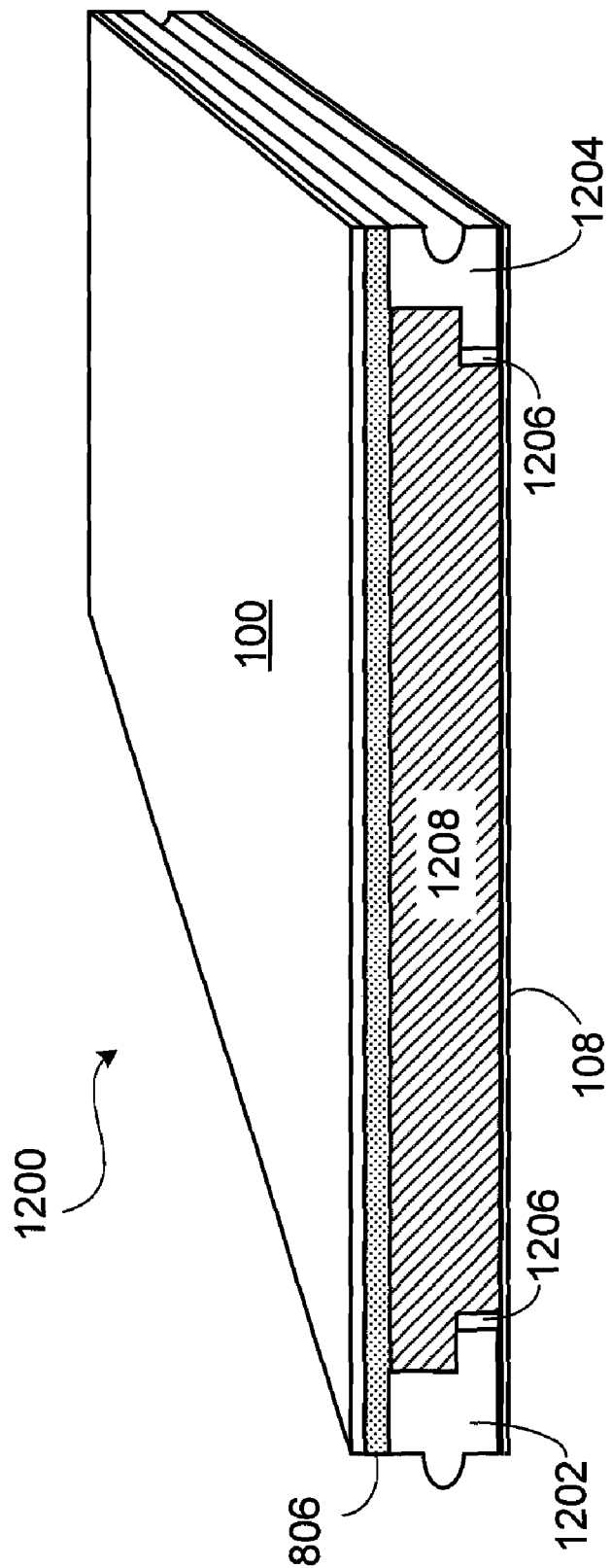
FIG. 12 illustrates yet another alternative embodiment with a gap between an "L" shape connector and a body.

FIGS. 8, 9, 10 illustrate alternative embodiments that allow expansion and contraction. In FIG. 8, the body 802 has a plurality of expansion slots 804. These expansion slots may be located in the upper part of the body 902 as shown in FIG. 9; the expansion slots may also "cut through" the body 1002 as shown in FIG. 10. In FIG. 10, effectively the body 1002 is divided into many sub-bodies with an expansion space between them. The surface of each expansion slot is preferably coated with a water resistant coating, thus providing an additional protection against unintended rupture of the bottom layer 108. The bottom layer 108 should preferably cover the entire bottom surface even when the body is equipped with the expansion slots. FIG. 12 illustrates an embodiment with two "L" shape connectors 1202, 1204 and a space 1206 between a connector 1202 and the body 1208. By making the leg of "L" shape a little bit shorter as shown in FIG. 12, there is no need to make an expansion slot in either the connectors or in the body.

Moisture resistant floor boards according to the present invention provide many advantages. Because of limit used of small piece of solid wood in the tongue and groove connectors, the floor boards are less prone to warping and still provide good gripping to the nails that are used to fix the floor boards onto a sub-floor. The floor boards are also moisture resistant because it has four moisture barriers: moisture resistant coating on the top layer, moisture resistant tongue and groove connectors, moisture resistant bottom layer, and moisture resistant glue used to glue the components together. The body of a floor board is essentially sealed by the moisture resistant glue, moisture resistant teak wood used for the tongue and groove connectors, and the moisture resistant bottom layer. The invention enables the production of wider floor boards with less waste. For wide floor boards, a thin layer of the top layer is obtained from quality wood, thus a single large log can yield multiple thin layers. There is less waste during the manufacturing of the floor board. The overall use of wood is reduced because the body can be made from non-wooden material or material made from by products in the timber industry, thus minimizing the adverse impact on the environment.

Another advantage of moisture resistant floor board is unlikelihood of delamination. As the top layer wood veneer gains or loses moisture, it will create some stress to the floor board, because the moisture resistant floor board has only two layers, the moisture resistant floor board will be less likely to delaminate compared with the multilayer flooring boards, which are made from many layers of glue and thin soft woo. Delamination often occurs when a surface layer is thicker than a multilayer board on top of which it sits. The surface layer exerts more force when it expands and consequently tears apart weak layers inside the multilayer board. The floor board according to the invention has a thicker body and is not likely to be torn apart by the surface layer.

The delamination possibility can be further reduced by placing an extra middle layer 806 between the top layer 100 and the body 802. The middle layer 806 is preferably made from a hardwood as the top layer 100; however, the middle layer 806 may use wood that has less desirable appearance since the middle layer 806 is enclosed by the top layer 100 and the body 802. The wood grain of the middle layer 806 is preferably oriented in Y direction while the top layer 100 is oriented in X direction. The middle layer 806 may have a thickness of 1-3 mm. The use of the middle layer 806 will relieve the tension caused by the relative movement between the top layer 100 and the body 802. The top layer 100 and the body 802 may expand or contract at different rate. When the top layer 100 is attached directly onto the body 802, the different expansion rate causes a tension on both the top layer 100 and the body 802. The tension may crack the top layer 100 if the top layer 100 is thin. The use of the middle layer 806 relieves the tension and allows the top layer 100 to be thinner. The use of middle layer 806 also reduces the cost of the floor board according to the invention. The top layer 100 of a thick high end wood veneer can be replaced by a thin layer of high end wood veneer and a normal low end hardwood veneer.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, alternatives, and combinations of features shown in the above description are also possible. Accordingly, the claims are intended to cover all such equivalents. Dimensions in the drawings here presented are not to the scale unless otherwise indicated.

What is claimed is:

1. A moisture resistant floor board for hardwood floor, comprising:
 a top layer having a length, a top surface, and a under surface, the top layer having a left edge and a right edge;
 a tongue connector being made from a moisture resistant solid wood, the tongue connector having a top surface, a bottom surface, a left side, a right side, a tongue on the left side, and a groove on the right side, the top surface of the tongue connector being attached through a moisture resistant glue to the under surface of the top layer and aligned along the left edge of the top layer;
 a groove connector being made from a moisture resistant solid wood, the groove connector having a top surface, a bottom surface, a left side, and a right side, a tongue on the left side, and a groove on the right side, the top surface of the groove connector being attached through the moisture resistant glue to the under surface of the top layer and aligned along the right edge of the top layer;
 a body made from a man-made material, the body having a top surface, a bottom surface, and two opposing lateral surfaces, the top surface being attached through the moisture resistant glue to the under surface of the top layer, and the tongue connector and the groove connector being attached through the moisture resistant glue to the two opposing lateral surfaces; and
 a moisture resistant bottom layer having a top surface and a bottom surface, the bottom surface of the bottom layer being attached through the moisture resistant glue to the bottom surface of the tongue connector and the bottom surface of the groove connector.

2. The floor board of claim 1, wherein the moisture resistant bottom layer further comprising an aluminum foil.

3. The floor board of claim 1, wherein the moisture resistant bottom layer further comprising a plastic layer.

4. The floor board of claim 1, wherein the moisture resistant bottom layer being made from foam.

5. The floor board of claim 1, wherein the moisture resistant bottom layer further comprising a moisture resistant coating.

6. The floor board of claim 1, wherein the top surface of the top layer having a moisture resistant coating.

7. The floor board of claim 1, wherein the top layer further comprising a hardwood veneer.

8. The floor board of claim 1, wherein the top layer further comprising bamboo layer.

9. The floor board of claim 1, wherein the top layer further comprising a plastic wear layer and printed paper.

10. The floor board of claim 1, wherein the top layer comprises a plastic layer.

11. The floor board of claim 10, wherein the plastic layer being a leather layer.

12. The floor board of claim 1, wherein the top layer being made from teak.

13. The floor board of claim 1, wherein the body further comprising a particle board.

14. The floor board of claim 1, wherein the man-made material being cement board.

15. The floor board of claim 1, wherein the man-made material being composite silicate board.

16. The floor board of claim 1, wherein the man-made material being plastic.

17. The floor board of claim 1, wherein the man-made material being composite of plastic and wood.

18. The floor board of claim 1, wherein the man-made material being foam.

19. The floor board of claim 1, wherein the man-made material being rubber.

20. The floor board of claim 1, wherein the tongue connector further comprising an expansion slot that extends partially into the tongue connector.

21. The floor board of claim 1, wherein the groove connector further comprising an expansion slot that extends partially into the groove connector.

22. The floor board of claim 1, wherein the body further comprising at least one expansion slot that extends partially into the body.

23. The floor board of claim 1, further comprising a middle layer placed between the top layer and the body.

* * * * *